United States Patent [19]

Poli

[11] 4,132,294
[45] Jan. 2, 1979

[54] BRAKING DISC WITH REPLACEABLE LININGS, FOR BRAKE-DISCS

[76] Inventor: Antonio Poli, Piazza Matte-otti, 10-Romanengo (Cremona), Italy

[21] Appl. No.: 814,890

[22] Filed: Jul. 12, 1977

[30] Foreign Application Priority Data

Jul. 23, 1976 [IT] Italy ............................. 25645 A/76
May 10, 1977 [IT] Italy ............................. 23383 A/77

[51] Int. Cl.² .................................................. F16D 65/12
[52] U.S. Cl. ........................... 188/218 XL; 192/70.13; 192/107 R
[58] Field of Search ................ 188/71.6, 73.1, 73.2, 188/218 XL, 264 A, 264 AA; 192/70.12, 70.13, 107 R, 113 A

[56] References Cited

U.S. PATENT DOCUMENTS

| 2,289,689 | 7/1942 | Wilson | 188/218 XL |
| 3,933,228 | 1/1976 | Otto et al. | 188/218 XL |

FOREIGN PATENT DOCUMENTS

| 1048935 | 8/1953 | France | 188/264 M |
| 1031337 | 6/1958 | Fed. Rep. of Germany | 188/218 XL |
| 1961598 | 6/1971 | Fed. Rep. of Germany | 188/218 XL |
| 2315134 | 10/1974 | Fed. Rep. of Germany | 188/218 XL |

*Primary Examiner*—George E. A. Halvosa
*Attorney, Agent, or Firm*—Cushman, Darby & Cushman

[57] ABSTRACT

A brake disc assembly comprising: a hub provided with a circumferential radial flange structure extending therefrom and having front and rear annular faces; at least two sector shaped lining parts which together form an annular assembly, each part being of monolithic construction and including confronting front and rear sector-shaped linings, all of the linings together forming front and rear annular linings the outer surfaces of which will be acted on by braking jaws during use of the assembly, each of the parts being removably fitted over the flange structure in concentric relationship with the hub so that the front and rear faces of the flange structure lie between the opposed surfaces of the confronting front and rear sector-shaped linings, the linings having radially extending inner ribs projecting therefrom so as to form cooling passages open at both their radial inner and outer ends, at least some of the ribs having edges which serve as guides for the lining parts during fitting of the latter over the flange in a radial direction, the rib edges engaging the flange structure in the completed brake disc assembly; and for each sector-shaped lining part a single removable connecting element extending parallel to the axis of the hub and connecting the respective lining part with the flange structure, each of the connecting elements being located approximately at the center of the respective lining part.

7 Claims, 7 Drawing Figures

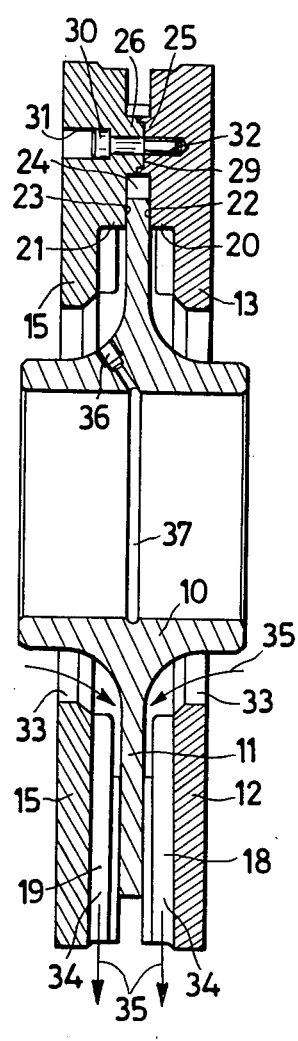
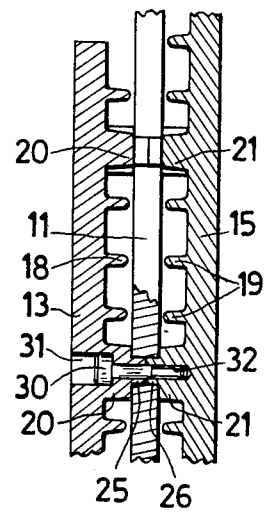

BRAKING DISC WITH REPLACEABLE LININGS, FOR BRAKE-DISCS

This invention relates to a braking disc fitted with replaceable linings, for disc brakes.

More particularly, the braking disc according to the invention is of the kind comprising two annular linings on which the braking jaws are active, the latter being applied to a central driving hub mounted on the shaft to be braked.

The braking disc according to the invention can find the most varied uses, such as for example in braking of industrial machines, such as cranes, conveyor carriages and the like, of conveying installations such as escalators, ropeways, ski-lifts, elevators and the like, of industrial transporting vehicles roadways and railroads. A specific and important application of the braking disc according to the invention is that of braking of axles of railway and street-car carriages, in which the hub which drives the annular annuli can be keyed to the axle or can even be formed by the wheel-centre expansion itself which has been properly machined.

In the latest years, there have been envisaged several systems for disc-braking, such as those with a removable single-piece braking disc, with a braking disc fitted with one or more annular linings, in which the annulus is made as a removable single-block unit, or is diametrically split into two removable components.

These conventional approaches, however, are impaired by a number of defects.

The component parts of the braking disc have, very often, such shapes and masses as to be abruptly variable with detrimental effects of heat transfer and distribution of the temperature gradients in the heat transitional phenomena, the result being the possible formation of fissures. The cooling air flow is neither uniform nor adequate and considerable deformation from the hot to the cold state may occur, and also during the thermal transitional phenomena. A considerable amount of heat is transferred from the active surfaces (on which thermal power is generated by friction) to the shaft on which the braking disc has been mounted. The mounting is intricate and requires specially designed tools in order to achieve a satisfactory centering and the driving of the annular lining relative to the hub, and the replacement of the linings only is cumbersome since oxidation and deformations due to heat are such as to alter the centering and calibration systems of the locking and driving members. It is an object of the present invention considerably to improve the construction, the operation and the upkeep of the braking linings as compared with the conventional ones, by doing away with the drawbacks aforementioned and, more particularly, by making it possible easily to replace the annular linings without resorting to specially provided tools and without removing also the driving hub and possibly also the other members mounted on the shaft to be braked, in the case that such members could constitute a hindrance.

In order that these objects may be achieved, the present invention provides a braking disc which comprises a central driving hub mounted on the shaft to be braked and two annular linings removably fitted on said hub, said disc being characterized in that the hub has, radiussed to its body, a flange having a large diameter and on the side surfaces of which gilled annular linings are arranged, in that such hub flange and said linings are equipped with means for the mutual engagement and drive, that union means are provided for fastening such linings to one another so as to form an entity which is guided both axially and radially by the hub flange, and that passageways are provided for the air which is centrifuged between the inner gilled surfaces of the linings and the surfaces of the hub flanges.

At least one of the annular linings can be divided into more sectors which can be latched together and can be removed so as to enable them to be dismembered in the radial direction relative to the axis of the driving hub. The latter can also be made of more component parts connected together, rather than being made as a single piece.

The mutual engagement and driving means provided on the hub flange and on the annular linings can preferably be formed by hollow spaces which can be open or closed on one side, projections being provided on the other side, which are formed, respectively, on the hub flange, or on the annular linings, or vice versa. In the place of projections, independent keys can also be used, and, if so, both the hub flange and the annular linings are fitted with corresponding hollow spaces.

These engagement and driving means can be provided in any appropriate number and they are evenly distributed along a circumferential area which appropriately coincides substantially with the braking area in which the braking jaws are active upon the braking annular linings.

The union means for fastening the confronting annuli mutually to one another can be made of movable members, such as pegs, rivets, screws, bolts and the like, which can possibly be used also in a miscellaneous form, or, if the annular linings are split into sectoral gores, the union between the sector of an annulus and those of the other annulus can also be obtained by casting or welding. In the latter case, the couples of sectors united together can be overhauled in a radial direction relative to the hub axis.

The foregoing and other details and advantages of the braking disc according to the present invention will become fully apparent from the ensuing description of a few exemplary nonlimiting embodiments thereof, given with reference to the accompanying drawings, wherein:

FIG. 2 is a cross-sectional view, taken along the line II—II of FIG. 1.

FIG. 3 is a cross-sectional view taken along the line III—III of FIG. 1.

Figure 1:
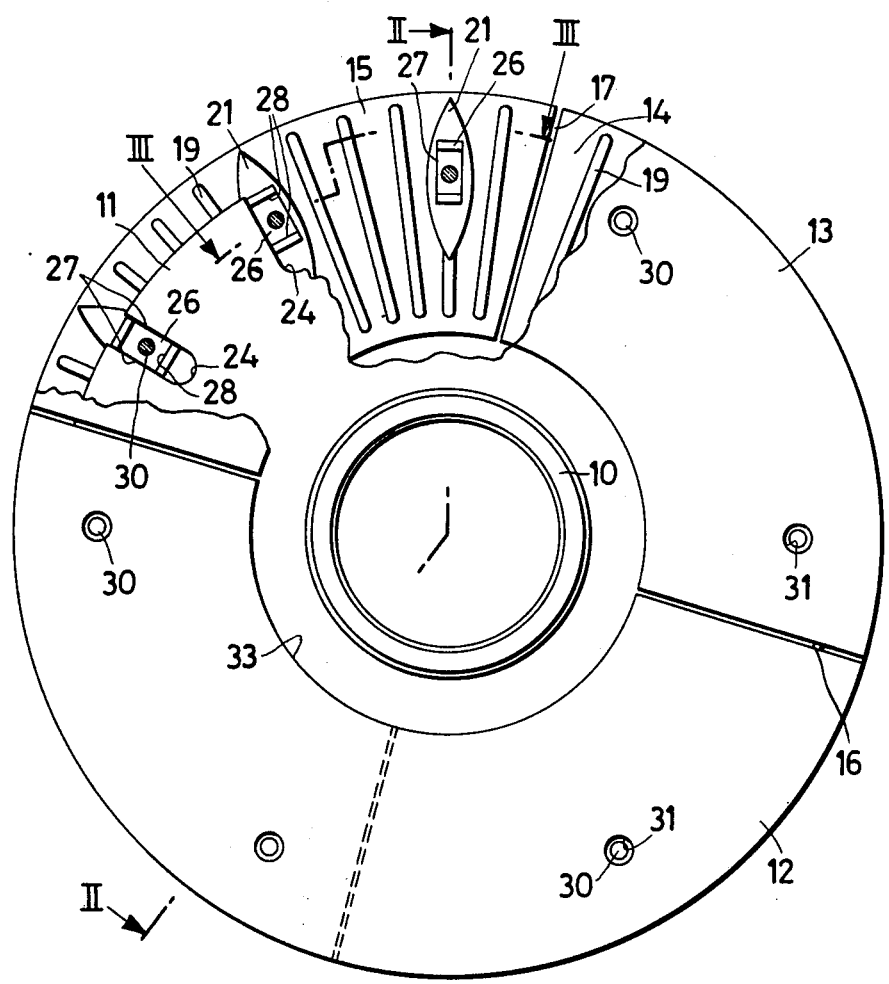
FIG. 1 is a front view, with a few portions removed, of a braking disc according to the invention in a first embodiment.

The braking disc shown in FIGS. 1 to 3 comprises a hub 10 fitted with a large diameter flange 11 which lies on a plane, perpendicularly to the hub axis. The flange 11 is properly radiussed to the hub body 10. In the Example shown, the hub 10 and its flange 11 are made as an entity.

In correspondence with the two side surfaces of the hub flange 11 of 10, there are mounted two annular linings which, in the example shown, are both split into two front half-circular annuli 12, 13 and two rear half-circular annuli 14, 15, respectively, as viewed according to the radial splitting planes 16 and 17, which are staggered relative to one another.

On the outer surfaces of the half-annular linings are active in the conventional way the braking jaws (not shown), whereas the inner surfaces of the linings are fitted with radial cooling ribs or gills 18 and 19, respectively. A few of such gills 18, 19 (in the case in point they are twelve evenly spaced apart gills) are oversized and the enlarged portions such as 20, 21 are in confronting relationship with the flanges 11 of the hub 10 and thus originate contact surfaces 22, 23 between the flange 11 and the half-annuli 12, 13 and 14, 15, respectively. Such contact surfaces lie on planes which are perpendicular to the hub axis.

In correspondence with the areas of contact of the enlarged sections 20, 21 of the half-annuli and the flange 11, the latter has through-cavities 24 which open towards the flange periphery. The cavity 24 houses projections 25, 26 which are formed through the enlarged sections 20, 21 and these projections, with their side surfaces 27 contact the respective sidewalls of the cavities 24 of the hub flange, such sidewalls lying on radial planes. In addition, the projections 25, 26 are mutually interlocked in a sort of mortise-and-tenon arrangement (see FIG. 2) and offer conjugated surfaces 28 of mutual contact which extend circumferentially, and also front surfaces 29 of mutual contact which lie on a plane which is perpendicular to the hub axis.

The front half-annuli 12, 13 are united to the rear half-annuli 14, 15 by the agency of twelve screws 30 which are arranged in correspondence with the projections 25, 26. The screws 30 are slipped through through-bores 31 formed on a side and are screwed in blind tapped holes 32 provided on the opposite side. The through-bores 31 are formed through the front half-annuli and the rear ones, in alternate sequence, and the corresponding blind holes 32 are formed, in a homolog alternate sequence, through the rear and front half-annuli.

Between the front and the rear annuli and the hub 10 with its flange 11 there are formed continuous circumferential openings 33, whereas, peripherally, there are formed openings 34 (see particularly FIG. 2). Due to the effect of the rotation of the hub and the annular linings associated therewith, air is drawn through the openings 33 and after having swept the surfaces of the flange 11 of the hub as well as the internal gilled surfaces of the annular linings, emerges through the outer openings 34 by following the path shown in FIG. 2 by the arrows 35. This air flow, in counterflow relationship with the heat flow which from the periphery of the annular linings reaches the center, ensures both an efficient and a uniform removal of heat.

In addition, the hub 10 has a tapped hole for the connection with the pressurized oil lubrication system in a channel 37 provided in the hub bore.

As can be seen from the foregoing description, the two annular linings which are formed, each, by two half annuli, make up, by virtue of the mutual engagement of the tenon-and-mortise kind of the projections 25, 26 with the circumferential conjugated contact surfaces 28 and the abutment ledge in correspondence with the front contact surfaces 29, a single concentrical entity as locked by the screws 30. Such a lining entity is axially guided by the flange 11 of the hub 10 by means of the contact surfaces 22, 23 and is thus spontaneously centered and driven to rotation by virtue of the engagement of the projections 25 and 26 in the hollow spaces 24 of the flange 11 associated with the contact of their side surfaces 27 with the sidewalls of the corresponding cavities of the flanges.

The overhauling of the hub lining, no matter where the latter has been keyed, and its re-installation in the accurately centered position can be achieved both very conveniently and quickly, without necessity of special tools, by merely removing and screweing again the locking screws 30.

Of course, if the application of the disc brake on the axle to be braked so permits, that is, if no obstruction is present which is due to members mounted coaxially to the brake disc, the two annular linings, instead of being divided into two or more sectors, can be made, both or either of them, in the form of a single annular piece.

In FIGS. 4 and 5, and 6 and 7, there are shown two additional examples of embodiments of the brake disc according to this invention. The modifications over the first embodiment described herein are principally concerned with the driving and engagement means of the annular linings by the hub flange and with the union means for uniting the annular linings to one another.

Figure 4:
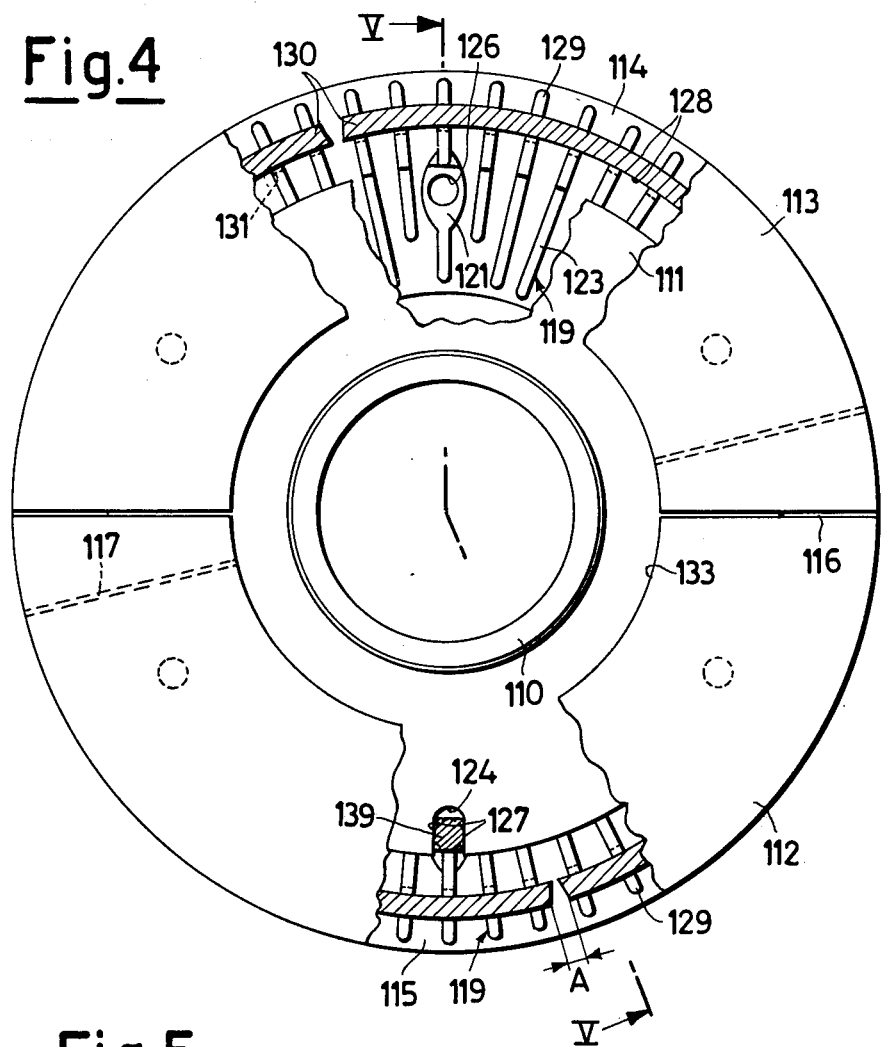
FIG. 4 is a view similar to FIG. 1 of a braking disc according to an alternative embodiment.
Figure 5:
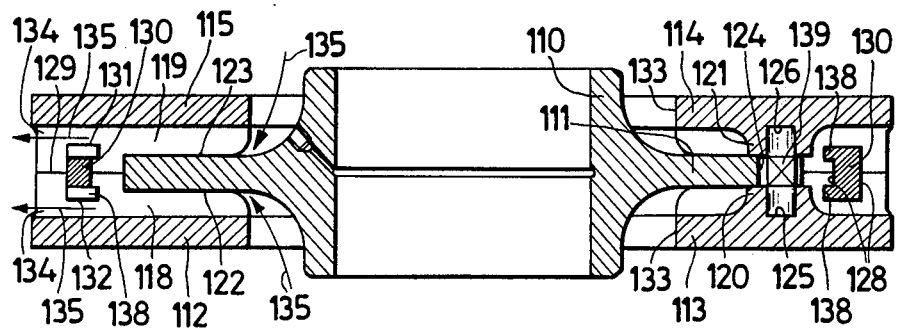
FIG. 5 is a cross-sectional view taken along the line V—V of FIG. 4.

The brake disc shown in FIGS. 4 and 5 also comprises a central hub 110 with a radiussed flange 111 which is inserted between the two ribbed or gilled annular linings, which are divided also in this example along the planes 116 and 117 in two front half-annuli 112, 113 and two rear half-annuli 114, 115, which are fitted on their inner faces with radial cooling gills 118 and 119, respectively. These gills are reduced in height up to the level of the outer circumference of the flange 111 and thus contact the flange with their surfaces 122 and 123 which are extended along planes perpendicular to the axis of the hub 110. By so doing, the assembly of the lining annuli is axially guided by the hub flange. Peripherally, the abutment relationship between the confronting half-annuli is achieved by the agency of the mutual contact front surfaces 129 of the respective gills 118 and 119.

In the peripheral area the gills 118 and 119 have seatings 131, 132 in the shape of an "L" which, in the example shown, are arranged along a circumference of the same grills. There are provided two half-circular bolts 130 which, at even distances apart corresponding to the circumferential spacings between the gills 118, 119 in correspondence with the seatings 131, 132, have teeth 138, so that in the portions having such teeth, the bolts take a U-shaped cross-sectional outline (see FIG. 5 on the right), whereas in the intermediate zones between the teeth, they have a rectangular cross-sectional shape (FIG. 5 on the left). When the bolts 130 are positioned as shown in FIGS. 4 and 5, their teeth 138 are inserted in the seatings 131, 132 in the shape of an "L" of the gills 118, 119, so that the bolts lock together the front and the rear half-annuli and make up a lining entity.

By circumferentially shifting the bolts 130 (the ends of which are properly spaced apart, see the distance A in FIG. 4), so that their teeth 138 emerge from the seatings 131, 132 in the gills 118, 119, by half-annuli are released and can be dismembered. By rotating the bolts in the opposite direction, the annuli are latched again. The bolts 130, which can be fitted with safety stops (not shown), by virtue of their circumferential contact surfaces 128 which contact the circumferential walls of the seatings 131, 132, also contribute towards defining the concentricity of the half-annuli 112, 113 and 114, 115.

A few of the gills 118, 119 (in the example shown six evenly spaced apart gills) have enlarged sections 120, 121 which are in confronting relationship with the flange 111, like the gills themselves. Each of these enlarged sections has a blind cavity, 125 and 126, respectively.

In correspondence with the contact area between the enlarged sections 120, 121 and the flange 111 of the hub 110, the flange has through-cavities 124, which are open in the direction of the periphery. Independent keys 139 are provided, which comprise a prismatic central shank and two cylindrical end portions. Such keys 139 are inserted with their central shanks in the cavities 124 of the flange 111, whereas their end portions are housed in the blind cavities 125, 126 as formed through the respective half-annuli. By so doing, the keys 139 provide both the centering and the driving connection between the flange 111 of the hub 110 and the half-annuli 112 and 113, 114 and 115 by means of the side surfaces 127 of their central shanks which in contact with the respective sidewalls of the cavities 124 of the flange and, by the engagement of their end portions in the blind cavities 125, 126.

The ventilation and cooling of the hub 110 with its flange 111 and the annular linings are provided in a way similar to that of the previous example, by circumferential openings 133 for air intake and peripheral openings 134 for discharging the air, the air being circulated along the path indicated in FIG. 5 by the arrows 135.

Figure 6:
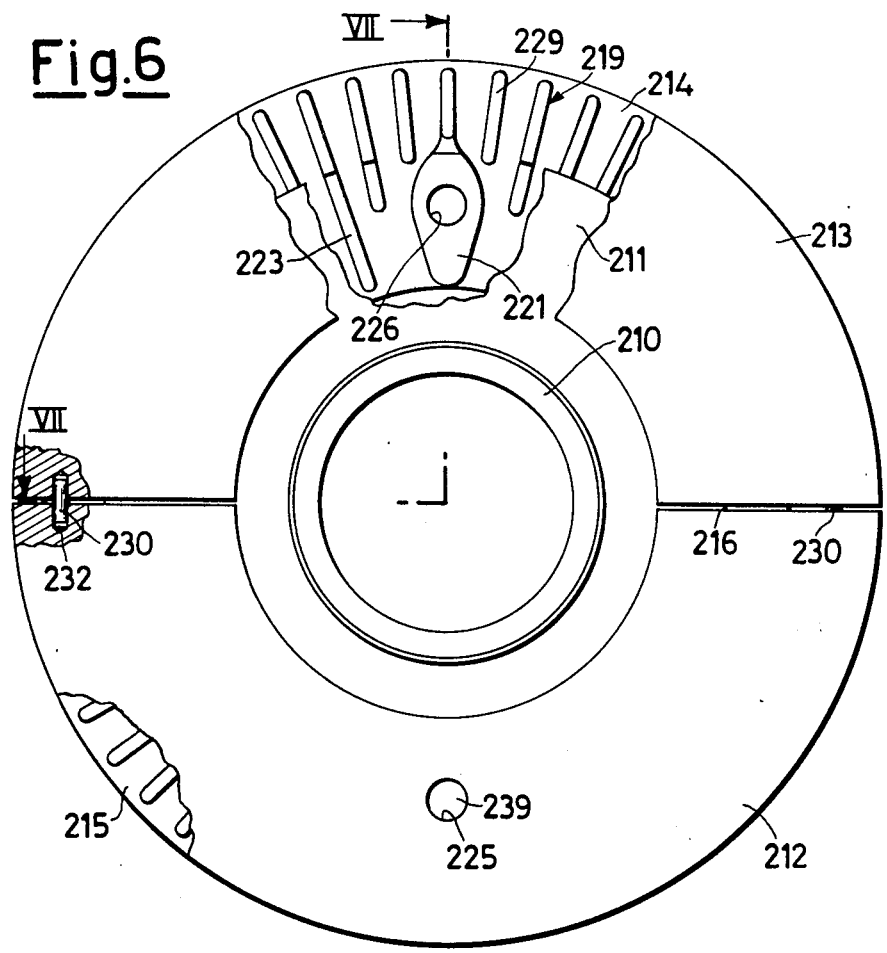
FIG. 6 is a front cutaway view of a third embodiment of the braking disc according to the invention.
Figure 7:
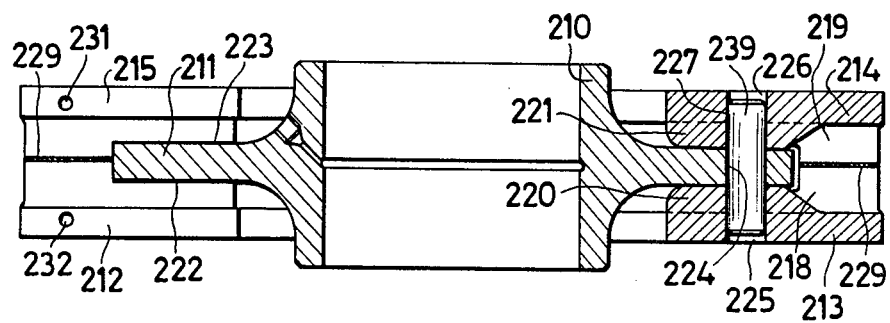
FIG. 7 is a cross-sectional view, taken along the line VII—VII of FIG. 6.

The third exemplary embodiment of the braking disc according to the invention is illustrated in FIGS. 6 and 7.

On the two sides of the flange 211 of the hub 210 are arranged the ribbed or gilled annular linings, which are split by a coincidence diametrical plane 216 into two front half-annuli 212, 213, and two rear half-annuli 214, 215, fitted with ribs or gills 218 and 219, respectively. With the shortened surfaces 222, 223 of the respective gills, the annuli contact the flange 211 and are thus guided peripherally whereas the abutment relationship between the opposite annuli is achieved by means of the front surfaces 229 for the mutual contact of the gills 218, 219. The union between confronting half-annuli renders each pair monolithic and is obtained in such a case by a mere casting or welding as effected in correspondence with the contact front surfaces 229 of the gills 218, 219 belonging to the front half-annuli 212, 213, and the rear half-annuli 214, 215, respectively. By removing the driving keys 239, to be described later, the couples of half-annuli can be withdrawn from the hub 210 in the radial direction relative to the hub axis.

In the example shown, the diametrically opposite gills of the front half-annuli and of the rear half-annuli, respectively, have enlarged sections 220, 221 confronting the flange 211, the latter having in correspondence with such enlarged sections a few through-cavities which, in the case in point, are holes 224. Also the enlarged sections 220, 221 have corresponding through-bores 225, 226 which are coaxially aligned with the holes 224 of the flange 211. Independent cylindrical keys 239 are provided, to be inserted in the holes 224, 225, 226 in order to achieve the centering and the driving engagement between the flange 211 of the hub 210 and the annular linings 212 and 213, 214 and 215 by means of their side surface 227 which contacts the walls of said holes.

The concentricity of the half-annuli 212 and 213, 214 and 215, is still better defined by pins or dowels 230 inserted in circumferential seatings 231, 232 as formed in the half-annuli (see FIG. 6 and FIG. 7).

The braking disc as constructed according to the present invention overcomes to a large extent the defects of the conventional arrangements. No considerable shape and mass variations are experienced, whereas the shape stability both in the cold and the hot condition is ensured, as well as in the thermal transition phenomena, the heat transfer by conduction to the shaft is reduced to a minimum both by virtue of the wide radiating surface of the hub flange and of the rationality of the system of centering and driving arranged along the braking area. The difficulties in replacing the annular linings are done away with radically, since the hub is not subject to centering alterations due to heat deformations, on account of its complete symmetry. Inasmuch as the system is self-centered, it is not influenced by possible oxidations of the hub.

The ventilation of the braking disc of the centrifugal type by two air streams coming from independent openings and flowing through independent channels in counterflow relative to the heat flow, involves a considerable improvement of the cooling efficiency of the braking disc over the systems which have been adopted heretofore and prevents heat from flowing from the braking surfaces proper to the shaft on which the hub is keyed.

The braking disc according to the present invention is thus such as to tender a maximum reliability, a constancy of shape in time also as regards the deformations due to heat and a considerable ease of dismantling and replacing the linings without having to remove the hub or component parts coaxial therewith and without using any special tools. The practical embodiment of the braking disc according to the present invention is not limited anyhow to the exemplary embodiments illustrated herein which can undergo modifications and changes well within the purview of the skilled artisan.

I claim:

1. A brake disc assembly comprising: a hub provided with circumferential radial flange means extending therefrom and having front and rear annular faces; at least two sector-shaped lining parts which together form an annular assembly, each part being of monolithic construction and including confronting front and rear sector-shaped linings, all of said sector-shaped linings forming together front and rear annular linings the outer surfaces of which will be acted on by braking jaws during use of the assembly, each of said parts being removably fitted over said flange means in concentric relationship with said hub so that said flange means lies between the opposed surfaces of the confronting front and rear sector-shaped linings, said linings having radially extending inner ribs projecting therefrom so as to form cooling passages open at both their radial inner and outer ends, at least some of said ribs having edges which serve as guides for said sector-shaped lining parts during fitting of the latter over said flange in a radial direction and during operation when thermal expansion occurs, said rib edges engaging said flange means in the completed brake disc assembly; and for each sector-shaped lining part a single removable connecting element extending parallel to the axis of said hub and connecting the respective lining part with said flange, each of said connecting elements being located approximately at the center of the respective lining part.

2. A brake disc assembly as in claim 1 wherein each of said connecting elements is located in a hole passing through the respective sector shaped lining part and through an aligned hole in said flange means, the hole in said lining part passing through two of said inner radial ribs, said two ribs having enlarged cross-sections which accommodate the holes therein.

3. A brake disc assembly as in claim 1 wherein said connecting element is located in an area on which brake jaws act during use of the brake disc assembly.

4. A brake disc assembly as in claim 1 including at least one pin for aiding in maintaining the sector shaped lining parts concentric with said hub, said pin lying in a plane parallel to the plane of said flange means and having two opposite end portions each of which is fitted in a hole in one of said lining parts.

5. A brake disc assembly as in claim 1 wherein at least some of said ribs have edges which engage the edges of opposed ribs at locations radially outward of said flange means.

6. A brake disc assembly as in claim 1 wherein the confronting front and rear linings of each sector-shaped part are welded together at their outer edges to form said monolithic construction.

7. A brake disc assembly as in claim 1 wherein the confronting front and rear linings of each sector-shaped part are cast as a single part to form said monolithic construction.

* * * * *